Patented Feb. 4, 1941

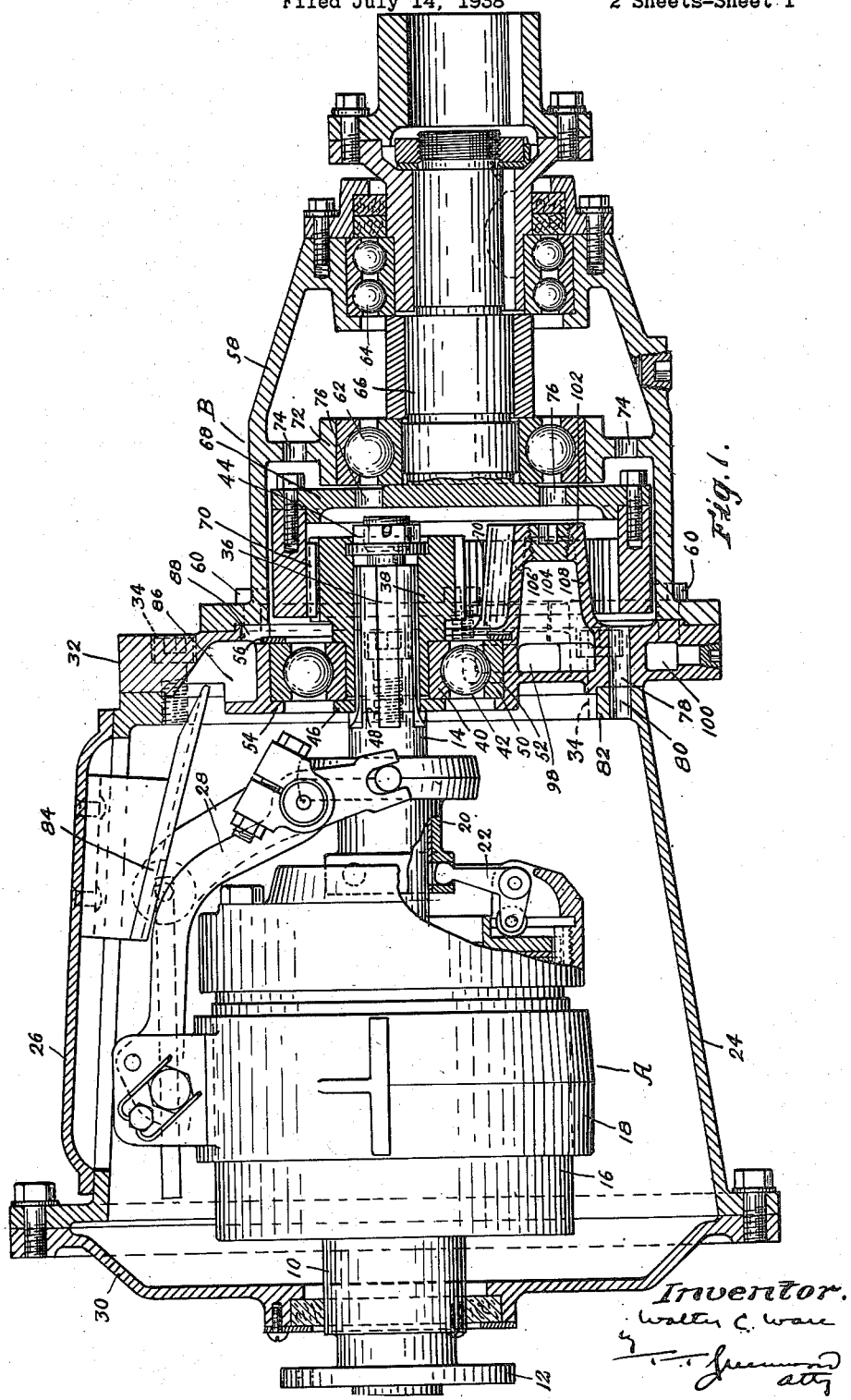

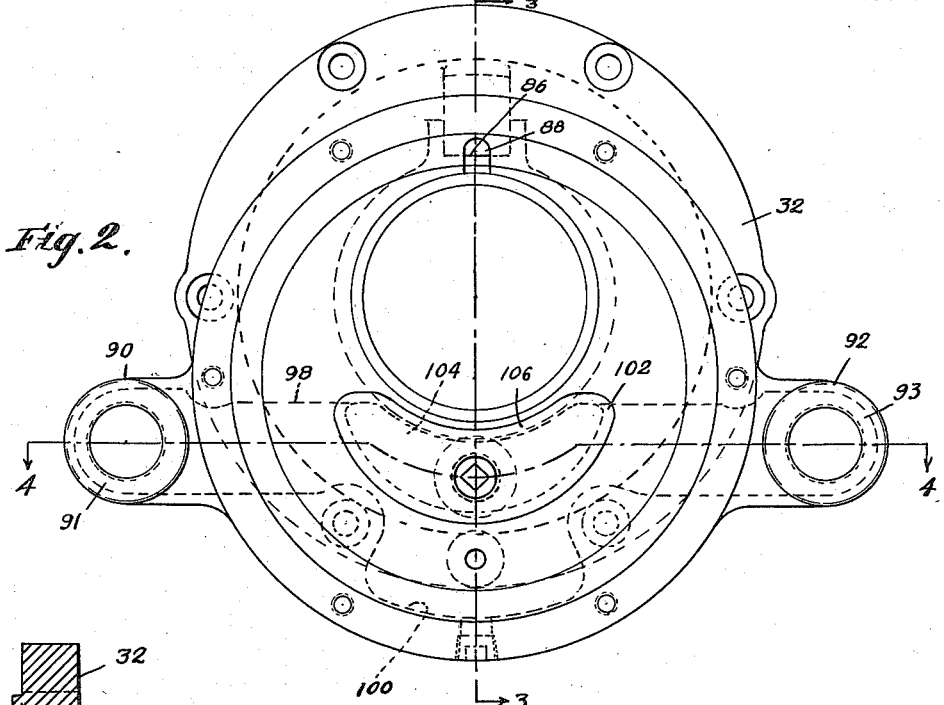
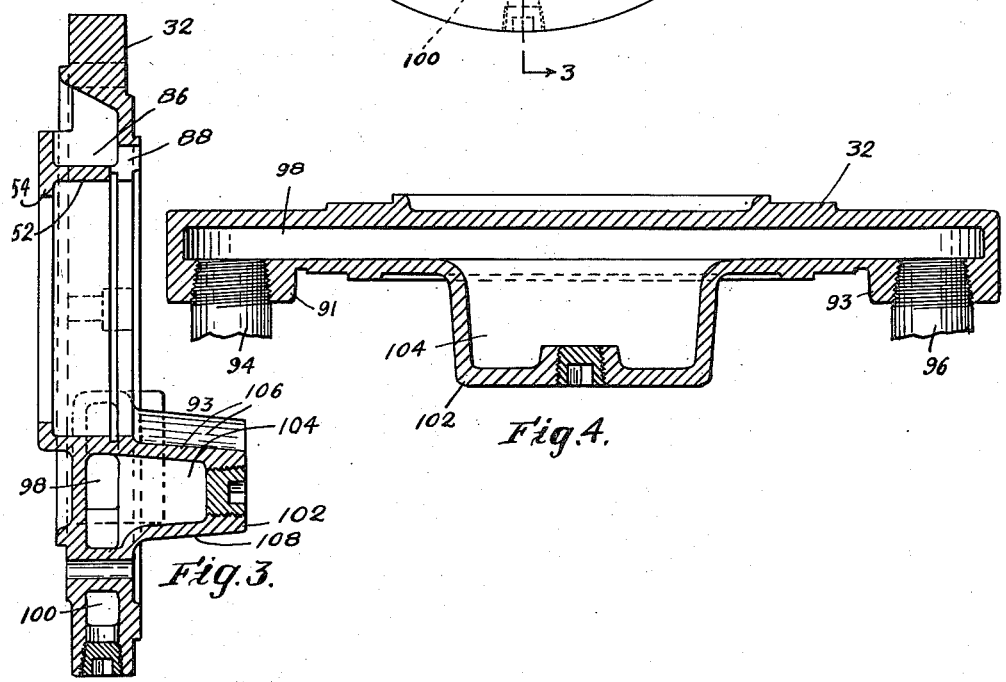

2,230,604

UNITED STATES PATENT OFFICE 2,230,604

REVERSE AND REDUCTION GEARING

Walter C. Ware, Taunton, Mass., assignor to Paragon Gear Works Inc., Taunton, Mass., a corporaton of Massachusetts Application July 14, 1938, Serial No. 219,226

8 Claims. (Cl. 184—104)

This invention relates to marine propulsion and to reverse and reduction gearings interposed between the engine and the propeller to secure forward and reverse drives of the propeller at a suitable propeller speed. The casings of both the reverse gearing and the reduction gearing are secured together endwise through an interposed adapter plate and are adapted to contain oil which lubricates the parts.

Heat is generated in the reduction gearing when it is operated for long periods of time since the intermeshing gears of the gearing are in continuous operation. Thus it is desirable to cool the oil in the reduction gearing casing. Some engines are provided with an oil circulating and oil cooling system. When a reverse and reduction gearing unit are operated from such an engine the cool engine oil can be circulated through the gearing casings and returned to the engine and cooled so that the oil flowing through the gearing casings can be kept cool. There are many engines, however, that are not provided with oil cooling means. With such engines it is common to provide the reduction gearing casing with a water jacket which surrounds the casing in part and through which cooling water is circulated. This arrangement, however, is not particularly efficient since the cooling water in the water jacket acts mainly upon a more or less quiescent body of oil in the reduction gearing casing. Thus the cooling of the oil is relatively slow. The water jacket also increases the diameter of the casing which should be small in diameter because of the confined space in which the reduction gearing is frequently located.

It is an object of the present invention to provide efficient cooling surfaces for the oil in the reduction gearing and preferably also in the reverse gearing, over which surfaces the warm oil can flow as films so that the oil can be rapidly and effectively cooled.

A further object of the invention is in the provision of cooling surfaces located between the body of oil in the bottom of the casing and the locality of gear tooth engagement so that the warm oil in falling from this locality passes onto the cooling surfaces and becomes cooled before running into the pool of oil. Thus the pool of oil is maintained cool and the casing is maintained at a relatively low temperature.

Another object of the invention is in the provision of a hollow adapter plate that connects the casings of the reverse and reduction gearings, the hollow adapter plate having passages through which cooling water is circulated and the exposed side faces of the plate constituting oil cooling surfaces over which the oil flows in a general downward direction into the oil pools of the two casings. The cooling passages of the adapter plate preferably are in part located below the oil levels in the casings so that heat is also abstracted from the pools of oil therein.

A yet further object is generally to improve the construction and operation of reverse and reduction gearings.

Fig. 1 is a sectional elevation taken through the longitudinal axis of a reverse and a reduction gearing embodying the present invention.

Fig. 2 is a view of the reduction gearing side of the adapter plate of Fig. 1.

Fig. 3 is a section of the adapter plate taken along line 3—3 of Fig. 2.

Fig. 4 is a section of the plate taken along line 4—4 of Fig. 2.

The reverse and reduction gearing embodying the present invention comprises a reverse gearing A and a reduction gearing B. The reverse gearing includes a driving shaft 10 having suitable means as an outstanding flange 12 at the exposed end thereof for securing the driving shaft in driving connection with the engine shaft, not shown. The reverse gearing also includes a driven shaft 14 which is in line with the driving shaft. A gear carrier 16 surrounds both the driving and the driven shafts and is journalled thereon and has gears not shown which mesh with gears of the driving and driven shafts for effecting reverse drive of the driven shaft when the carrier is held stationary by the tightening of an enclosing brake band 18 into holding engagement therewith. The gearing also includes clutch mechanism, not shown, for connecting the driving and driven shafts for forward drive of the driven shaft, the clutch mechanism being operated by a sleeve 20 axially movable on the driven shaft and operating clutch-setting fingers 22.

The reverse gearing is enclosed within a suitably supporting casing 24 having a removable cover plate 26 at the top through which access to the operating mechanism 28 can be gained. The open left hand end of the casing is closed by a suitable plate 30 through which the driving shaft is extended. The right hand open end of the casing 24 is closed by an adapter plate 32 which is secured to the casing by bolts or screws 34.

The reduction gearing B includes the driven shaft 14 which shaft is the driving shaft of the reduction gearing. Said shaft is provided with a plurality of splines 36 which receive the hub 38 of a pinion or spur gear. The inner race 40 of a ball bearing 42 is located on the hub and the hub and the inner race are clamped between a nut 44 screw-threaded on the end of the shaft and a collar 46 which abuts against an outstanding shoulder 48 of the shaft. The outer race 50 of the ball bearing is received within an annular socket 52 of the adapter plate and abuts against an inwardly extended flange 54 thereof and is held in position by a split ring 56 which is located removably in an annular groove of the socket.

The reduction gearing has an enclosing casing 58 open at one end and secured at that end to the outer face of the adapter plate by suitable means as screws 60. The casing carries axially spaced sets of anti-friction bearings 62 and 64 which rotatably support the propeller shaft 66 of the gearing. Said shaft is integral with a radially outstanding flange 68 which carries an internal gear 70 meshing with the driving spur gear 38. The internal gear is larger than the spur gear to obtain the desired reduction in speed and hence the propeller shaft 66 is at one side of or under the line of the reverse gearing shafts. The anti-friction bearing 62 is supported by an internal web 72 which has oil passages 74 therethrough. The flange 68 also has oil passages 76 therethrough so that oil can flow lengthwise of the casing and lubricate the end bearings 64.

The adapter plate at the bottom thereof is provided with an oil passage 78 therethrough which registers with a corresponding passage 80 formed in the inwardly directed flange 82 of the reverse gearing casing so that the pools of oil in the two casings are in communication.

Lubricating oil is contained in the reverse gearing casing to stand at some level where the rotating gear carrier 16 or a rotating part thereof is immersed in the oil. Oil is carried upwardly by the rotating carrier and thrown against the upper part of the casing where the oil collects in a trough 84 attached to the inner face of the cover plate 26. The trough is inclined and the oil is guided downwardly toward the adapter plate and runs off the lower end of the trough into an oil pocket 86 formed in the upper part of the adapter plate above the bearing socket 52. The pocket is provided with an opening or passage 88 leading through the rear face of the adapter plate above the intermeshing region of the pinion gear 38 and internal gear 70 of the reduction gearing so that the oil falls directly onto the meshing teeth of the gears. The oil runs from the gears over surfaces of the adapter plate to be cooled as will be immediately explained and thence falls into the lower part of the reduction gearing casing and returns through the passages 78 and 80 to the reverse gearing casing.

The adapter plate is provided with opposed ears 90 and 92 which outstand in opposite directions from the circumference or edge of the plate and have rearwardly directed bosses 91 and 93 that are threaded to receive water circulating inlet and outlet pipes 94 and 96. The ears and the plate between the ears are hollow so that a water passage 98 is provided through the plates between the bosses. The passage has a downward enlargement 100 in the middle thereof which extends below the oil level in the casings so that cooling water can be in contact with the opposite faces of the lower portion of the plate and thus cool the bodies of oil in the casings.

The reduction gearing face of the adapter plate is provided with a rearwardly extended hollow cooling boss 102 having a water space 104 therein which communicates with the water passage 98. The cooling boss 102 has an upper arcuate wall 106 which is concentric with the pinion 38 and is disposed thereunder. The boss has a lower arcuate wall 108 which is substantially concentric with the internal gear 70 and is disposed therein. The boss extends close to the internal gear flange 68 and extends upwardly within the internal gear on opposite sides of the vertical line through the gearing and between the internal and the pinion gears to present a substantial amount of cooling surface and to receive the oil that flows into the top of the reduction gearing casing through the passage 88 and also the oil that escapes from the gears.

The oil flows over the cooling surfaces of the adapter plate and the cooling boss 102 in films which are thin so that the oil is rapidly cooled by the cold walls of the adapter plate and the boss. The adapter plate cools the oil immediately after it has been heated by the intermeshing parts of the gears and before the oil falls into the pool of oil in the bottom of the gear casing. Thus the pool of oil is maintained cooled and the temperature of the entire gearing is kept low. The cool oil flows through the passages 78 and 80 into the reverse gearing casing where it is recirculated. The walls of the water passages in the adapter plate that are submerged beneath the pools of oil in the two casings also act directly on the pools of oil to cool the oil.

I claim:

1. The combination of a reverse gearing, a reduction gearing, casings enclosing said gearings, an adapter plate interposed between and detachably connecting said casings and forming the rear wall of the reverse gearing casing and the front wall of the reduction gearing casing, said adapter plate having an upper oil passage for the transmission of oil from the reverse gearing to the reduction gearing casing and having a lower passage for the transmission of oil from the reduction gearing to the reverse gearing casing, said reverse gearing having a rotating operative part thereof raising oil from the reverse gearing casing to said upper oil passage, said adapter plate being hollow where it is in contact with the body of oil in a casing and having means admitting of the circulation of a cooling medium through said hollow part.

2. The combination of a reverse gearing, a reduction gearing, oil containing casings enclosing said gearings, a casing end-plate located in and connecting both casings and in contact with the oil in both casings, and means for circulating a cooling medium through said plate.

3. In a reduction gearing, an enclosing casing, an adapter plate on the end of said casing, meshing spur and internal gears within said casing, said adapter plate having an oil passage through the upper part thereof in position to guide oil over the inner face of the plate and to the tooth meshing region of said gears and also having a hollow boss projecting into said internal gear under and partially surrounding said spur gear on the side opposite the meshing region and also under said oil passage, said plate having an oil exit passage under said boss, and means for circulating a cooling medium through said hollow boss.

4. The combination of a reverse gearing, a reduction gearing, oil containing casings enclosing said gearings, an adapter plate interposed between and connecting said casings, said adapter plate being hollow in its under part where it is in contact with the pools of oil in both of said casings, and means to circulate a cooling medium through said hollow part.

5. The combination of a reverse gearing, a reduction gearing, oil containing casings enclosing said gearings, an adapter plate interposed between and connecting said casings, said adapter plate being hollow in its under part where it is in contact with the pools of oil in said casings, means to circulate a cooling medium through said hollow part, and said plate also having a hollow boss communicating with said hollow part and projecting into said reduction gearing casing.

6. The combination of a reverse gearing, a reduction gearing, oil containing casings enclosing said gearings, an adapter plate interposed between and connecting said casings, said adapter plate having an oil passage through the upper part thereof for conducting oil from the reverse gearing casing into the upper part of the reduction gearing casing, said reverse gearing having a rotating part operative to raise oil from the oil body in its casing to said passage, said adapter plate also having a lower oil passage therethrough for conducting oil from said reduction gearing to said reverse gearing casings, said adapter plate being hollow and having means for circulating a cooling fluid therethrough and providing cooled surfaces in contact with the bodies of both casings.

7. The combination of a reverse gearing, a reduction gearing having meshing spur and internal gears, oil containing casings enclosing said gearings, an adapter plate interposed between and connecting said casings, said adapter plate having an oil passage through the upper part thereof for conducting oil from the reverse gearing casing into the upper part of the reduction casing and to the meshing region of said gears, said reverse gearing having a rotating part operative to raise oil from the oil body in its casing to said passage, said adapter plate also having a lower oil passage therethrough for conducting oil from said reduction gearing to said reverse gearing casings, said adapter plate being hollow and having means for circulating a cooling fluid therethrough and providing cooled surfaces in contact with the bodies of both casings, and also having a hollow boss through which the cooling medium circulates and which boss is disposed within said internal gear and under said spur gear and at least in part above the oil body in said reduction gearing casing in position to receive and cool falling oil in said casing.

8. The combination of a reverse gearing, a reduction gearing, oil containing casings enclosing said gearings, an adapter plate interposed between and connecting said casings, said adapter plate being hollow in its under part where it is in contact with the pools of oil in said casings, said plate having a hollow boss communicating with said hollow part and projecting into one of said casings, and means to circulate a cooling medium through said hollow part and said hollow boss.

WALTER C. WARE.